United States Patent
Panza

(10) Patent No.: US 11,261,099 B2
(45) Date of Patent: Mar. 1, 2022

(54) PROCESS FOR THE SYNTHESIS OF AMMONIA

(71) Applicant: Casale SA, Lugano (CH)

(72) Inventor: Sergio Panza, Como (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/469,740

(22) PCT Filed: Sep. 26, 2017

(86) PCT No.: PCT/EP2017/074313
§ 371 (c)(1),
(2) Date: Jun. 14, 2019

(87) PCT Pub. No.: WO2018/108345
PCT Pub. Date: Jun. 21, 2018

(65) Prior Publication Data
US 2019/0359494 A1    Nov. 28, 2019

(30) Foreign Application Priority Data

Dec. 14, 2016    (EP) .................................... 16203939

(51) Int. Cl.
*C01C 1/04* (2006.01)

(52) U.S. Cl.
CPC ............ *C01C 1/0447* (2013.01); *C01C 1/047* (2013.01); *C01C 1/0476* (2013.01); *C01C 1/0488* (2013.01)

(58) Field of Classification Search
CPC ............. B01J 2219/00024; B01J 3/006; C01B 2203/0233; C01B 2203/0244; C01B 2203/04; C01B 2203/068; C01B 2203/1241; C01B 2203/142; C01B 3/025; C01C 1/04
See application file for complete search history.

(56) References Cited

U.S. PATENT DOCUMENTS

| | | | | |
|---|---|---|---|---|
| 5,137,547 A | * | 8/1992 | Chretien | ................ B01D 53/04 95/55 |
| 5,211,880 A | * | 5/1993 | Primdahl | ................ B01B 1/005 252/376 |
| 5,736,116 A | | 4/1998 | LeBlanc et al. | |
| 5,997,834 A | * | 12/1999 | Udengaard | ........... C01C 1/0405 422/148 |
| 7,070,750 B2 | | 7/2006 | Lippmann et al. | |
| 2006/0228284 A1 | * | 10/2006 | Schmidt | ............... F25J 3/04545 423/352 |
| 2012/0207663 A1 | | 8/2012 | Iob | |

FOREIGN PATENT DOCUMENTS

CN    1837048 A    9/2006

OTHER PUBLICATIONS

International Search Report issued in connection with PCT/EP2017/074313.
International Preliminary Report on Patentability issued in connection with PCT/EP2017/074313.

* cited by examiner

*Primary Examiner* — Steven J Bos
*Assistant Examiner* — Syed T Iqbal
(74) *Attorney, Agent, or Firm* — Akerman LLP

(57) ABSTRACT

A dual pressure process for the synthesis of ammonia from a make-up gas, wherein the make-up gas is reacted in two steps in series, the second step operating at a greater pressure than the first step, and wherein a portion of the effluent of the first step is recycled back to the first step, said portion containing unreacted make-up gas.

7 Claims, 3 Drawing Sheets

PROCESS FOR THE SYNTHESIS OF AMMONIA

This application is a national phase of PCT/EP2017/074313, filed Sep. 26, 2017, and claims priority to EP 16203939.0, filed Dec. 14, 2016, the entire contents of both of which are hereby incorporated by reference.

FIELD OF THE INVENTION

The invention relates to the field of the synthesis of ammonia from a make-up gas containing hydrogen and nitrogen. In particular, the invention relates to a dual pressure process for the synthesis of ammonia.

PRIOR ART

Ammonia is synthesized at industrial level by catalytic conversion of a make-up synthesis gas comprising hydrogen ($H_2$) and nitrogen ($N_2$) at high pressure.

Said make-up gas is produced in a front-end section by reforming of a suitable hydrocarbon feedstock such as natural gas. Said front-end section includes, for example, a reforming section and a purification section. The reforming section may comprise a primary reformer and a secondary reformer; the purification section typically comprises one or more shift converters, a carbon dioxide removal section and a methanation section.

The purified make-up gas is obtained at a pressure which is much lower than the synthesis pressure and is elevated to the synthesis pressure in a suitable gas compression section, usually by a multi-stage compressor. The compressed make-up gas is than supplied to a synthesis section wherein it is converted into ammonia. The synthesis section typically comprises a synthesis loop operating at around 80-300 bar pressure.

The make-up gas comprises $H_2$ and $N_2$ in a molar ratio of around of 3:1 and a small content of non-reacting components such as methane ($CH_4$) and argon (Ar), which impede the conversion rate and which will be referred to as "inert gases". They accumulate in the synthesis loop circulating gas and their concentration is controlled by withdrawal of a purge gas stream from the loop.

In order to reduce the disadvantages associated with high concentrations of inert gases, dual pressure processes have been proposed wherein ammonia is synthesized in a first loop and a second loop in series operating at increasing pressures. The first synthesis loop typically comprises a converter, a cooler-condenser and an ammonia separator. In the prior art of the dual pressure ammonia processes, the converter of the first synthesis loop is once-through. An example is disclosed in EP 1 339 641.

In a conventional dual pressure ammonia process, most of ammonia (typically more than 60%) is synthesized in the second loop. When an increase of capacity is desired, however, the second loop may reach its limits and become a bottleneck. Furthermore, controlling the temperature at the outlet of the converter of the first synthesis loop is difficult and the equipment downstream of the converter are exposed to the risk of nitridation.

SUMMARY OF THE INVENTION

The invention aims to provide an improved dual pressure ammonia process. In particular, the invention aims to provide a process with increased capacity and better control of the temperature after the converter of the first synthesis loop.

The term "capacity" is to be understood as the amount of ammonia that is or can be produced.

These aims are achieved with a process for the synthesis of ammonia from a make-up gas according to claim 1. The make-up gas comprises hydrogen ($H_2$) and nitrogen ($N_2$) in a molar ratio of around 3:1.

Said process comprises a first reactive step at a first pressure $P_1$ and a second reactive step at a second pressure $P_2$ greater than the first pressure, wherein: the first reactive step provides a product stream containing ammonia and a gaseous effluent containing unreacted make-up gas; a first portion of said gaseous effluent is subjected to said second reactive step, and a second portion of said gaseous effluent is recycled to said first reactive step.

Preferably, said process comprises a step of compression of the gaseous effluent of the first reactive step from said first pressure $P_1$ to said second pressure $P_2$ and, according to different embodiments, the second portion of the gaseous effluent is taken before or after said step of compression. Said second portion will be also referred to as a recycle portion.

Preferably, said first pressure $P_1$ ranges between 60 and 130 bar, while said second pressure $P_2$ preferably ranges between 150 and 280 bar.

According to a first embodiment of the invention, the second portion of the gaseous effluent is taken before said compression stage and is recycled to said first reactive step through an ejector, wherein a motive fluid is accelerated through a narrowing creating a depression and hence sucking said recycle portion.

Preferably, said motive fluid is the make-up gas feeding the first reactive step. As a result, the make-up gas acting as motive fluid and the recycle portion containing the unreacted make-up gas mix together to provide the input stream to said first reactive step.

According to this embodiment, the gaseous effluent of the first reactive step is only partially subjected to said step of compression. Preferably, it splits into a first portion and a second portion; said first portion is supplied to said step of compression and the so-obtained compressed stream is subjected to the second reactive step, while the second portion is recycled back to said first reactive step.

According to a second embodiment of the invention, the second portion of the gaseous effluent is taken after said compression stage and is recycled directly to said first reactive step. The term "directly" denotes that said second portion is recycled back to the first reactive step without being further compressed, e.g. without passing through an ejector.

Preferably, said recycle portion mixes with the make-up gas thus forming the input stream to the first reactive step.

According to this embodiment, the gaseous effluent of the first reactive step is entirely or substantially entirely subjected to said step of compression and the so-obtained compressed stream provides for both said first and second portions.

Preferably, the above identified make-up gas is obtained by compressing to the first pressure $P_1$ a make-up gas stream within a compressor. Said make-up gas stream is preferably obtained by reforming of a hydrocarbon feedstock and subsequent purification in a front-end section, and said compressor is suitable to pressurize said make-up gas stream from a front-end pressure of around 15-30 bar to the first pressure of around 60-130 bar.

According to preferred embodiments, the second reactive step produces a product stream containing ammonia and a purge gas stream mainly containing hydrogen, nitrogen and inert gases. Said purge gas stream is preferably subjected to a recovery process which separates hydrogen as a hydrogen-containing stream.

According to some embodiments, said hydrogen-containing stream is mixed with the make-up gas and said mixing is performed at the suction- or delivery-side of the compressor elevating the pressure of the make-up gas from the front-end pressure to the first pressure $P_1$.

A dual pressure ammonia plant according to the annexed claims is also object of the present invention.

Said plant comprises a first synthesis loop operating at a first pressure $P_1$ and a second synthesis loop operating at a second pressure $P_2$ greater than the first pressure, wherein: the first synthesis loop provides a product stream containing ammonia and a gaseous effluent containing unreacted make-up gas; a first line is arranged to supply a first portion of said gaseous effluent to said second synthesis loop, and a second line is arranged to recycle a second portion of said gaseous effluent to said first synthesis loop.

The first synthesis loop preferably comprises at least one converter, a cooler-condenser and an ammonia separator. According to the invention, said at least one converter operates as a recycle converter instead of one-through.

A further object of the present invention is a method for revamping an existing dual pressure ammonia plant according to the claims as enclosed.

A first advantage of the present invention is an increased production of ammonia in the first synthesis loop and related unloading of the second synthesis loop. This results in an increased plant capacity for given sizes of the equipment.

A further advantage is a better control of the outlet temperature of the converter(s) of the first loop. Accordingly, the risks of nitridation downstream of said converter(s) are significantly reduced.

The invention will now be elucidated with the help of the following description of preferred and non-limiting embodiments.

DETAILED DESCRIPTION OF PREFERRED EMBODIMENTS

Figure 1:
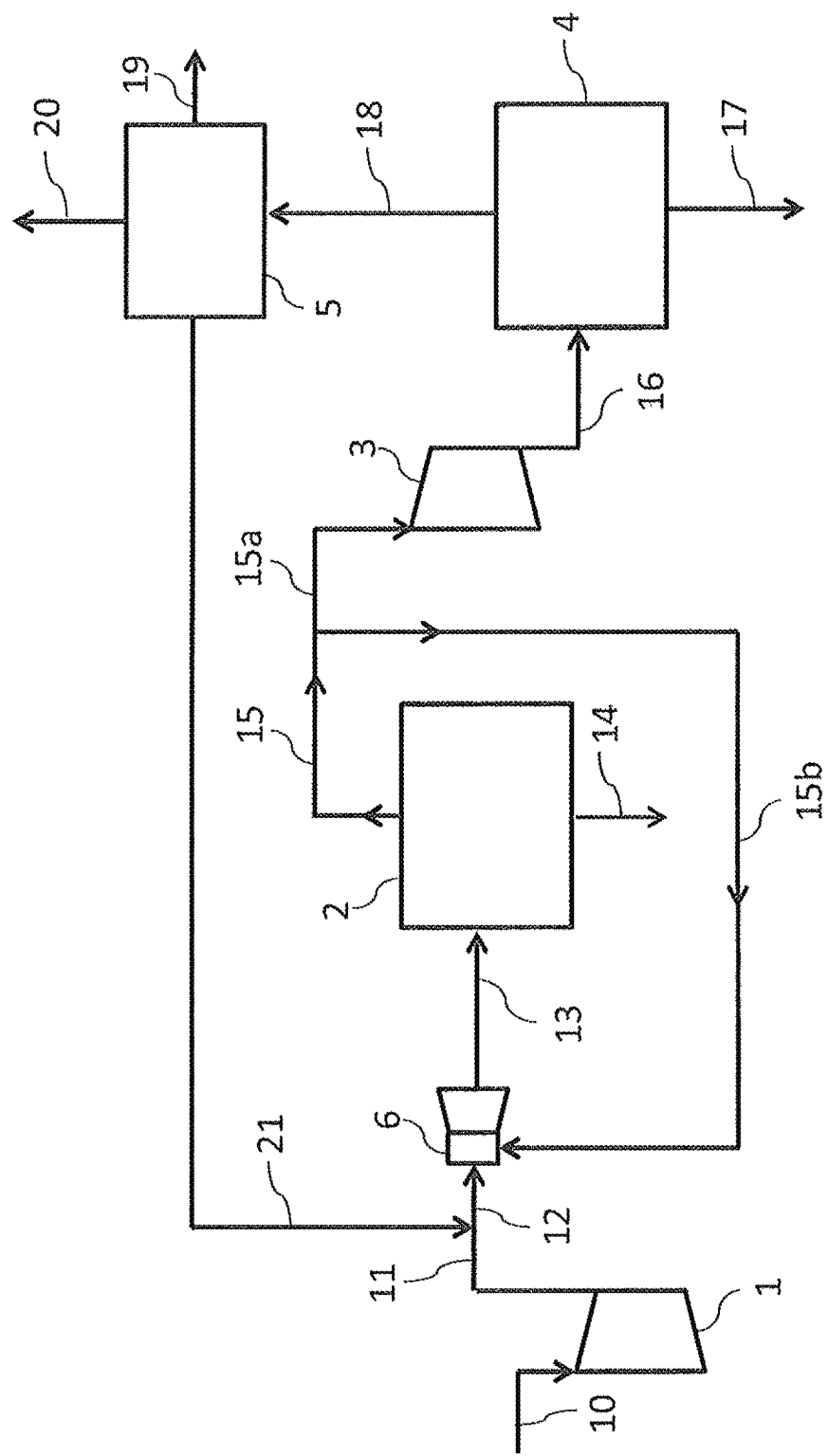
FIG. 1 is a scheme of a plant for the synthesis of ammonia from a make-up synthesis gas according to a first embodiment of the invention.

The plant of FIG. 1 essentially comprises a first compressor 1 elevating the pressure of a make-up gas from the front-end pressure to a first pressure $P_1$, a first ammonia synthesis loop 2, a second compressor 3 elevating the pressure of the effluent of the first loop 2 to a second pressure $P_2$, a second ammonia synthesis loop 4, a purge gas recovery section 5 and an ejector 6. The first loop 2 operates at pressure $P_1$ and the second loop 4 operates at pressure $P_2$.

Said first pressure $P_1$ is preferably in the range 60-130 bar and said second pressure $P_2$ is preferably in the range 150-280 bar.

A make-up gas 10 is compressed in the first compressor 1 to the pressure $P_1$. Said make-up gas 10 is obtained in a front-end section (not shown) of the plant, for example by reforming of a hydrocarbon feedstock at a pressure which is significantly lower than pressure $P_1$, e.g. of around 15 to 30 bar.

The so compressed make-up gas 11 is mixed with a hydrogen-containing stream 21 extracted from said purge gas recovery section 5, thus obtaining a current 12.

Said current 12 and a gas stream 15b recirculated from the effluent 15 of the first synthesis loop 2 are supplied to the ejector 6, wherein they mix together thus forming the input stream 13 to said first synthesis loop 2. Said current 12 works as motive fluid to suck the gas stream 15b and supply it to the first loop 2.

Figure 3:
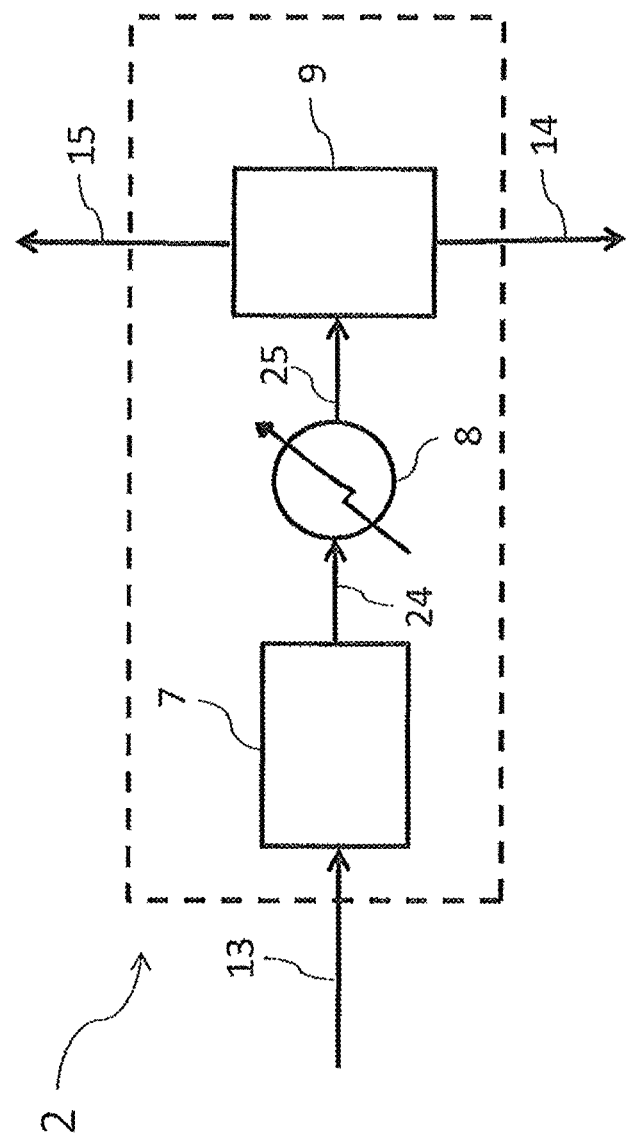
FIG. 3 shows in greater detail the first synthesis loop.

The so obtained stream 13 enters the first synthesis loop 2, which provides a liquid ammonia product 14 and a gaseous stream 15 containing the unreacted make-up gas. As shown in FIG. 3, said stream 13 enters a converter 7 providing a partially reacted gaseous stream 24 containing ammonia and unreacted make-up gas. Said gaseous stream 24 is cooled inside a cooler-condenser 8, wherein ammonia partially condenses to provide a mixture 25. Said mixture 25 subsequently enters an ammonia separator 9, wherein the liquid ammonia product 14 is separated from the gaseous phase 15. Said gaseous phase 15 also contains ammonia not condensed in the cooler-condenser 8.

Said gaseous phase 15 splits into two portions 15a, 15b. The first portion 15a is supplied to the second compressor 3, wherein it is compressed to the pressure $P_2$ providing a pressurized stream 16, and the second portion 15b is recirculated back to the delivery-side of the first compressor 1 in order to further react in the first synthesis loop 2.

Said pressurized stream 16 is fed to the second synthesis loop 4 wherein it further reacts to provide an ammonia product 17 and a purge gas 18.

Said purge gas 18 is continuously withdrawn from the synthesis loop 4 to limit the accumulation of inert gases and is sent to the recovery unit 5. Said purge gas 18 contains some ammonia, which is preferably recovered as an ammonia solution 19 in said recovery unit.

Said purge gas recovery unit 5 also separates the inert gases 20 from a hydrogen-containing stream 21, which is recycled to the delivery-side of the first compressor 1, mixing with the make-up gas 11 thus forming the current 12.

Alternatively, the hydrogen recovered from said purge recovery unit 5 can be recycled to the suction-side of the first compressor. Recycling the hydrogen 21 at the delivery-side or the suction-side of the first compressor 1 depends on the pressure at which the hydrogen-containing stream is discharged from the purge recovery unit 5.

Figure 2:
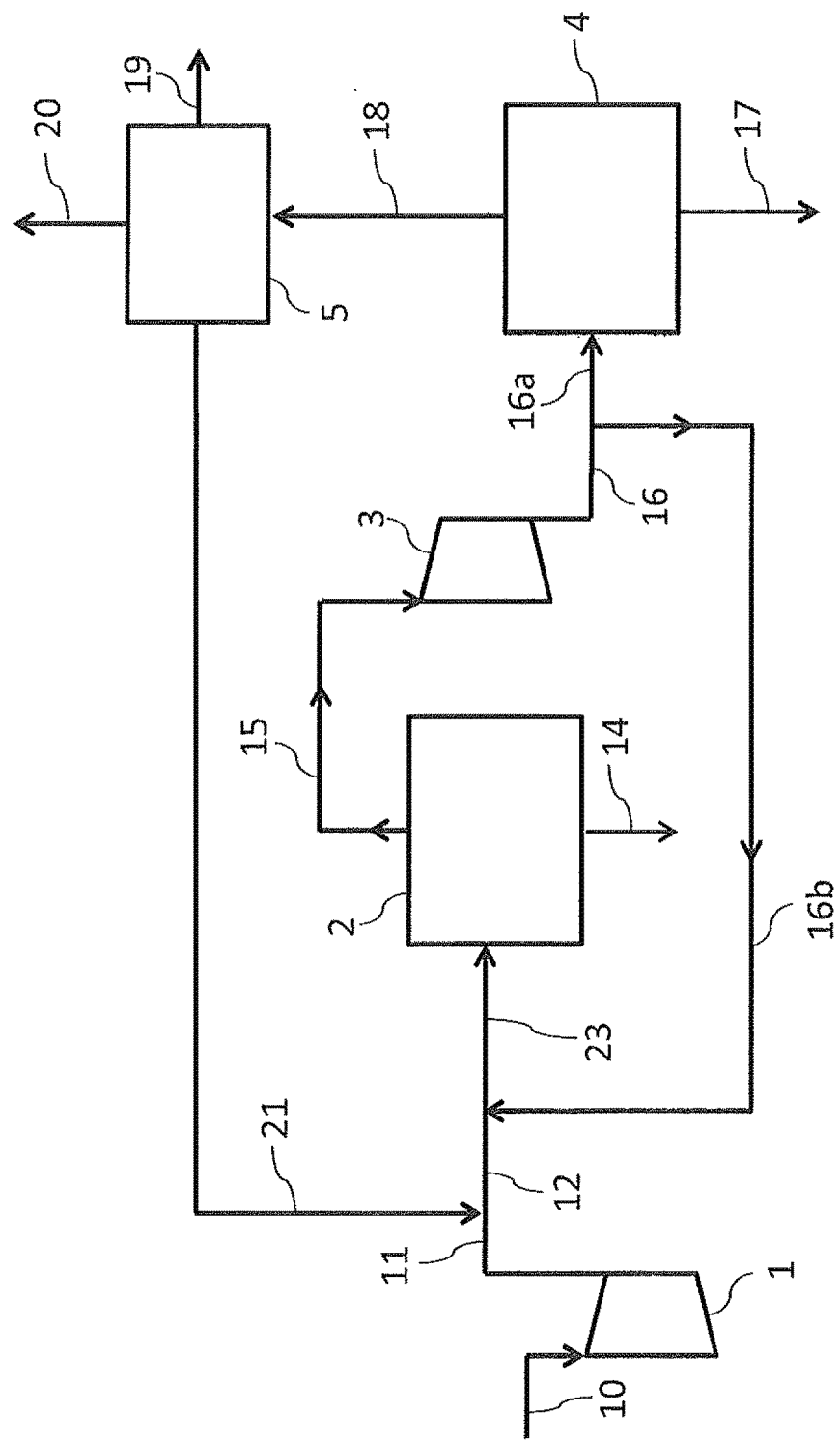
FIG. 2 is a variant of the plant of FIG. 1.

FIG. 2 shows a variant of the plant of FIG. 1. Equipment and flow lines in common with the plant of FIG. 1 are indicated with the same reference numbers.

According to this embodiment, the gaseous phase 15 extracted from the first synthesis loop 2 is entirely supplied in the second compressor 3, thus providing the pressurized stream 16.

Said stream 16 splits into two portions 16a, 16b. The first portion 16a is fed to the second synthesis loop 4 and the second portion 16b is recirculated back to the delivery-side of the first compressor 1. Said second portion 16b mixes with the current 12 thus forming the input stream 23 to the first synthesis loop 2. In this case, the ejector 6 is not required thanks to the higher pressure of the stream 16b.

What is claimed is:

1. A process for the synthesis of ammonia from a make-up gas, the process comprising a first reactive step at a first pressure and a second reactive step at a second pressure greater than the first pressure, wherein:
the first reactive step provides a product stream containing ammonia and a gaseous effluent containing unreacted make-up gas;

a first portion of said gaseous effluent is subjected to said second reactive step, and a second portion of said gaseous effluent is recycled to said first reactive step, the process further comprising a step of compression of the gaseous effluent of the first reactive step from said first pressure to said second pressure, wherein the second portion of said gaseous effluent is taken before said step of compression and is recycled to said first reactive step through an ejector.

2. The process according to claim 1, wherein said make-up gas works as motive fluid inside said ejector.

3. The process according to claim 2, wherein said make-up gas mixes with said second portion inside the ejector forming the input stream to said first reactive step.

4. The process according to claim 1, said second reactive step providing a purge gas stream containing hydrogen and at least part of said hydrogen is separated from said purge gas stream as a hydrogen-containing stream.

5. The process according to claim 4, wherein said hydrogen-containing stream mixes with said make-up gas.

6. A method for revamping a plant for the synthesis of ammonia from a make-up gas, the plant comprising:

a first synthesis loop operating at a first pressure, wherein said make-up gas reacts at the first pressure providing a first product stream and a gaseous effluent containing unreacted make-up gas;

a second synthesis loop operating at a second pressure greater than the first pressure, wherein a first portion of said gaseous effluent reacts at the second pressure providing a second product stream;

a compressor, wherein said gaseous effluent of the first synthesis loop is compressed from the first pressure to the second pressure, wherein:

installation of a line for recycling a second portion of said gaseous effluent to the first synthesis loop, said line being installed at a suction-side of the compressor, and comprising the installation of an ejector at the inlet of the first synthesis loop, so that said second portion of said gaseous effluent is taken before said step of compression and is recycled to the first synthesis through said ejector.

7. The method according to claim 6, said ejector being installed on the feeding line of the make-up gas to the first synthesis loop, so that the make-up gas is motive fluid in said ejector.

* * * * *